(12) United States Patent
Seto et al.

(10) Patent No.: US 7,526,107 B2
(45) Date of Patent: Apr. 28, 2009

(54) CARD ISSUING SYSTEM, CARD ISSUING METHOD, AND MACHINE READABLE MEDIUM STORING THEREON CARD ISSUING PROGRAM

(75) Inventors: Satoshi Seto, Tokyo (JP); Kazuo Shiota, Tokyo (JP); Yukita Gotohda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 563 days.

(21) Appl. No.: 11/065,291

(22) Filed: Feb. 25, 2005

(65) Prior Publication Data
US 2005/0196021 A1   Sep. 8, 2005

(30) Foreign Application Priority Data
Feb. 27, 2004   (JP)   ............................. 2004-054967
Feb. 24, 2005   (JP)   ............................. 2005-049222

(51) Int. Cl.
G06K 9/00   (2006.01)
(52) U.S. Cl. ..................... 382/118; 340/5.53; 340/5.83
(58) Field of Classification Search ................ 382/118; 340/5.53, 5.83
See application file for complete search history.

(56) References Cited

U.S. PATENT DOCUMENTS

| | | | | |
|---|---|---|---|---|
| 4,811,408 A | * | 3/1989 | Goldman | .................... 382/115 |
| 5,432,864 A | * | 7/1995 | Lu et al. | .................... 382/118 |
| 5,642,160 A | * | 6/1997 | Bennett | .................... 348/156 |
| 2003/0018522 A1 | * | 1/2003 | Denimarck et al. | ........... 705/14 |
| 2004/0213437 A1 | * | 10/2004 | Howard et al. | .............. 382/115 |

FOREIGN PATENT DOCUMENTS

| | | |
|---|---|---|
| JP | 61-176871 A | 8/1986 |
| JP | 3-216568 A | 9/1991 |
| JP | 11-304888 A | 11/1999 |
| JP | 2000-003386 A | 1/2000 |

* cited by examiner

*Primary Examiner*—John B Strege
(74) *Attorney, Agent, or Firm*—Sughrue Mion, PLLC

(57) ABSTRACT

A card issuing system that performs personal authentication efficiently and with high accuracy. The card issuing system includes: a personal card reading unit operable to read a face image and personal information from a personal card; an image capturing unit operable to take a face image of a user; a similarity computing unit operable to compute a degree of similarity between the face image read by the personal card reading unit and the face image taken by the image capturing unit; and a display unit operable to display the face image read by the personal card reading unit, the face image taken by the image capturing unit, and the degree of similarity computed by the similarity computing unit side-by-side.

4 Claims, 7 Drawing Sheets

| ITEM NAME | CONTENT |
|---|---|
| OLD FACE IMAGE |  |
| NEW FACE IMAGE |  |
| A DEGREE OF SIMILARITY | 80% |
| ADDRESS | . . . . . |
| NAME | . . . . . |
| DATE OF BIRTH | . . . . . |

CARD ISSUING SYSTEM, CARD ISSUING METHOD, AND MACHINE READABLE MEDIUM STORING THEREON CARD ISSUING PROGRAM

This patent application claims priority from Japanese Patent Applications No. 2004-054967 filed on Feb. 27, 2004 and No. 2005-049222 filed on Feb. 24, 2005, the contents of which are incorporated herein by reference.

BACKGROUND OF THE INVENTION

1. Field of the Invention

The present invention relates to a card issuing system, a card issuing method, and a machine readable medium storing thereon a card issuing program. More particularly, the present invention relates to a card issuing system, a card issuing method, and a machine readable medium storing thereon a card issuing program that issue a card on which a face image is printed.

2. Description of Related Art

Conventionally, a system that renews a card owned by a user to issue a new card is known as disclosed, for example, in Japanese Patent Laid-Open No. 2000-3386. A conventional card issuing system performs so-called personal authentication by an attendant who confirms whether a user is really an owner of a card to be renewed by comparing a face image printed on the card and a face image taken by photographing the user on the spot. Although the user is the same person as that on the card, since an appearance of a face varies a bit across the ages, personal authentication by visual check is important on the point that sufficiently high accuracy should be assured.

However, in the conventional card issuing system, since the confirmation of a face image maintaining sufficiently high accuracy requires a block of time even in the case of a skill person, there was a problem that authentication efficiency and convenience fall when the plurality of users use the system.

SUMMARY OF THE INVENTION

To solve the problem, according to the first aspect of the present invention, there is provided a card issuing system. The card issuing system includes: a personal card reading unit operable to read a face image and personal information from a personal card; an image capturing unit operable to take a face image of a user; a similarity computing unit operable to compute a degree of similarity between the face image read by the personal card reading unit and the face image taken by the image capturing unit; and a display unit operable to display the face image read by the personal card reading unit, the face image taken by the image capturing unit, and the degree of similarity computed by the similarity computing unit side-by-side.

The card issuing system may further include: a new card creation approving unit operable to approve a creation of a new card when it is judged that the face image read by the personal card reading unit and the face image taken by the image capturing unit are images of the same person; and a new card creating unit operable to print the personal information read by the personal card reading unit and the face image taken by the image capturing unit on the surface of the new card and also store the information and the image on a memory provided in the new card in order to create the new card when being approved by the new card creation approving unit. The new card creating unit may further store the face image read by the personal card reading unit and the degree of similarity computed by the similarity computing unit on the memory provided in the new card. The card issuing system may further include a personal information inputting unit operable to input an updated personal information, and the new card creating unit may print the updated personal information input by the personal information inputting unit and the face image taken by the image capturing unit on the surface of the new card and also store the information and the image on a memory provided in the new card in order to create the new card when being approved by the new card creation approving unit.

The card issuing system may further include a personal card discarding unit operable to discard the personal card by punching a hole in a position where at least a part of an electric circuit having information of the personal card is provided within the personal card after the new card has been created by the new card creating unit. The card issuing system may further include a new card issuing unit operable to discharge and issue the new card created by the new card creating unit after the hole has been punched by the personal card discarding unit in a position where at least a part of an electric circuit having information of the personal card is provided within the personal card.

The card issuing system may further include an image capturing controlling unit operable to control an image capturing condition of the image capturing unit for the face image of the user so that the image capturing condition is substantially same as an image capturing condition for the face image stored on the personal card. The image capturing controlling unit may control the image capturing condition of the face image of the user in the image capturing unit based on the face image read by the personal card reading unit from the personal card. The personal card reading unit may further read image capturing condition information showing an image capturing condition stored the personal card from the personal card, and the image capturing controlling unit may control an image capturing condition of the image capturing unit for the face image of the user so that the image capturing condition is substantially same as the image capturing condition shown by the image capturing condition information. The new card creating unit may further store the image capturing condition information showing an image capturing condition of the image capturing unit for the face image of the user on the memory provided in the new card in order to create the new card.

The new card creating unit may print the face image read by the personal card reading unit on the surface of the new card and also store the face image taken by the image capturing unit on the memory provided in the new card in order to create the new card. The card issuing system may further include a difference detecting unit operable to detect a point of difference between the face image read by the personal card reading unit and the face image taken by the image capturing unit when the degree of similarity computed by the similarity computing unit is lower than a predetermined reference value, and the display unit may display the detected point of difference when the degree of similarity computed by the similarity computing unit is lower than the predetermined reference value. The display unit may display a region showing the detected point of difference in a form surrounded by a frame on each face image when the degree of similarity computed by the similarity computing unit is lower than the predetermined reference value.

According to the second aspect of the present invention, there is provided a card issuing method. The card issuing method includes: a personal card reading step reading a face image and personal information from a personal card; an image capturing step taking a face image of a user; a similarity computing step computing a degree of similarity between the face image read in the personal card reading step and the face image taken in the image capturing step; and a display step displaying the face image read in the personal card reading step, the face image taken in the image capturing step, and the degree of similarity computed by the similarity computing step side-by-side.

According to the third aspect of the present invention, there is provided a machine readable medium storing a card issuing program for causing a computer to function as a card issuing apparatus. The program causes the computer to act as the card issuing apparatus including: a personal card reading unit operable to read a face image and personal information from a personal card; an image capturing unit operable to take a face image of a user; a similarity computing unit operable to compute a degree of similarity between the face image read by the personal card reading unit and the face image taken by the image capturing unit; and a display unit operable to display the face image read by the personal card reading unit, the face image taken by the image capturing unit, and the degree of similarity computed by the similarity computing unit side-by-side.

According to the present invention, it is possible to perform personal authentication efficiently and with high accuracy.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
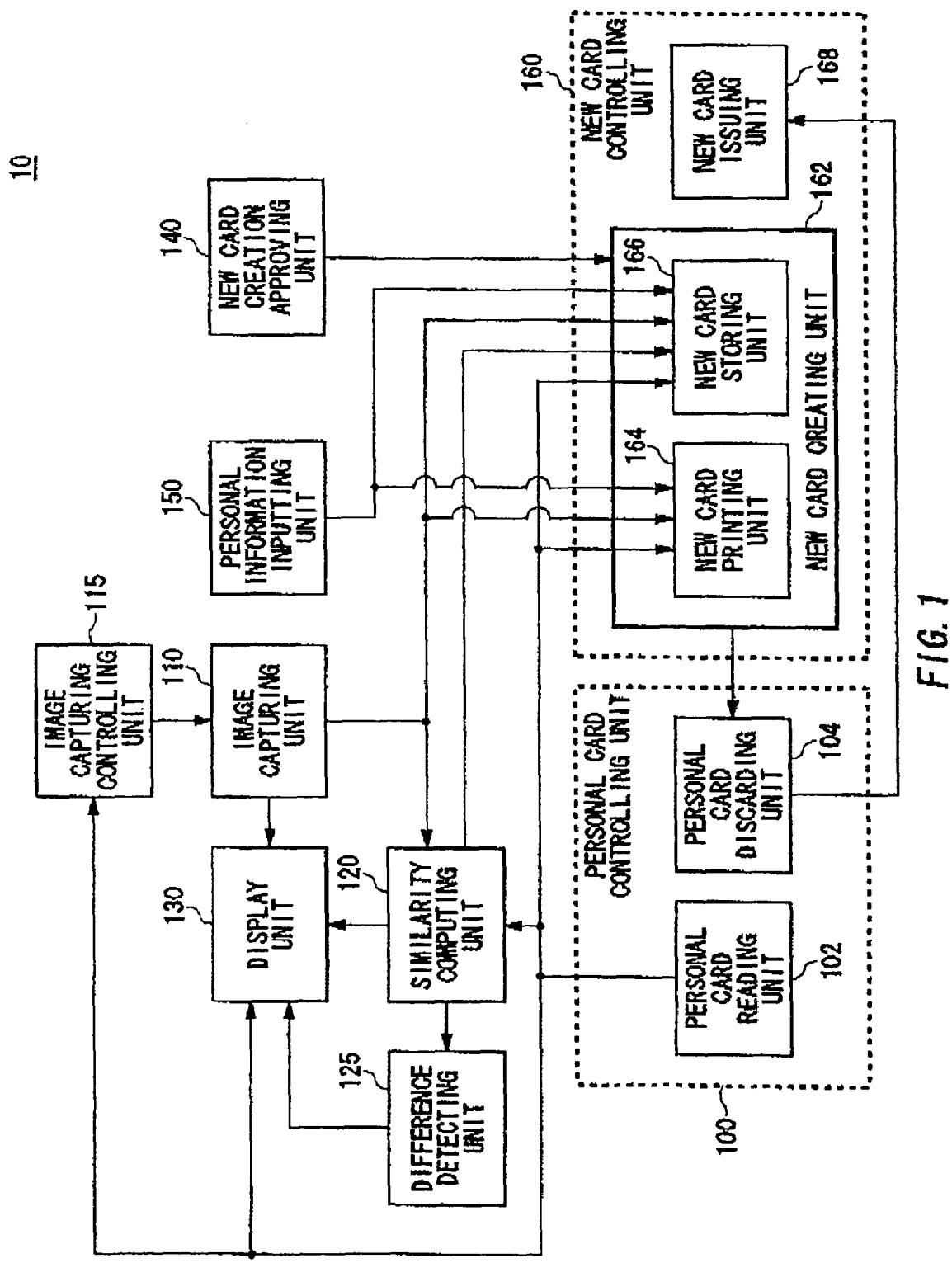
FIG. 1 is a block diagram exemplary showing a configuration of a card issuing system according to an embodiment.
Figure 2A:
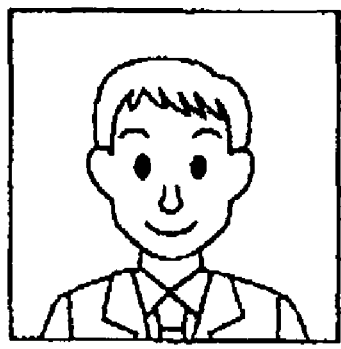
FIG. 2A-2F are exemplary diagrams showing a process realized by a similarity computing unit according to the present embodiment.
Figure 2B:
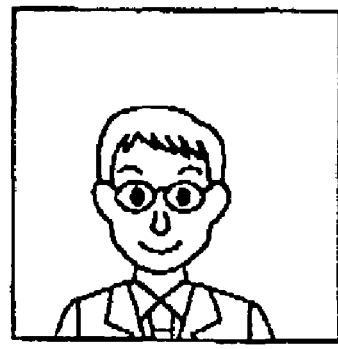
Figure 2C:
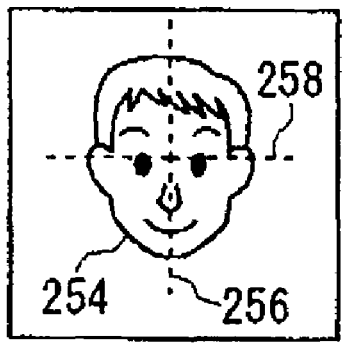
Figure 2D:
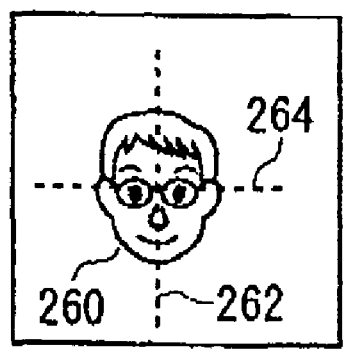
Figure 2E:
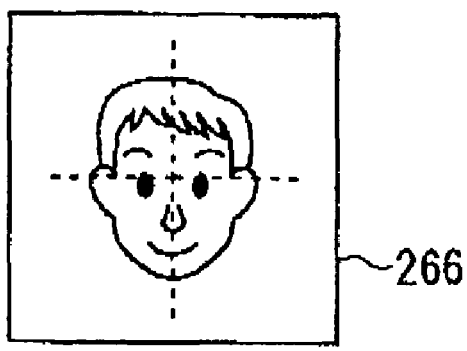
Figure 2F:
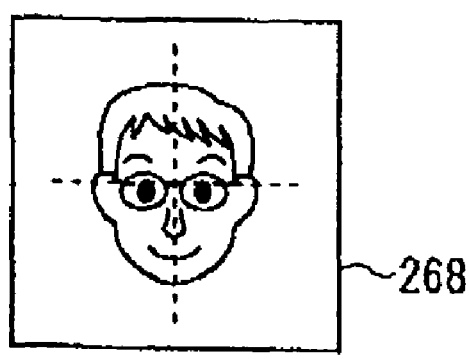

FIG. 1 is a block diagram exemplary showing a configuration of a card issuing system 10 according to the present embodiment. The card issuing system 10 issues card-type recording media in which personal information (personal specific information) such as a driver's license and an employee ID card, various membership cards are recorded. In the present invention, a card-type recording medium owned by a user beforehand is described as "a personal card", and a card-type recording medium newly issued by the card issuing system 10 is described as "a new card".

Here, a personal card and a new card are, e.g., an IC card (Smart card) having an IC chip including a memory, and store personal information on its memory. In addition, the personal card and the new card may be a magnetic stripe card that records personal information in a magnetic stripe, or may be a card that records personal information with bar-codes and two-dimensional codes. Further, in the present embodiment, the card issuing system 10 may use the same sort of card as the personal card and the new card. In this case, the card issuing system 10 can be used for renewing of a card such as a driver's licenses. Alternatively, the card issuing system 10 may use cards different from each other as the personal card and the new card.

The object of the card issuing system 10 according to the present embodiment is to create a new card based on personal information recorded in a personal card and also perform so-called personal authentication by which whether a user applying for the issue of a new card is a personal card owner is confirmed efficiently and with high accuracy.

The card issuing system 10 includes a personal card controlling unit 100 having a personal card reading unit 102 and a personal card discarding unit 104, an image capturing unit 110, an image capturing controlling unit 115, a similarity computing unit 120, a difference detecting unit 125, a display unit 130, a new card creation approving unit 140, a personal information inputting unit 150, and a new card controlling unit 160 having a new card creating unit 162 and a new card issuing unit 168.

The personal card reading unit 102 reads a face image and personal information from a personal card, and outputs the read face image (hereinafter, referred to as an old face image) and personal information to the image capturing controlling unit 115, the similarity computing unit 120, the display unit 130, and the new card creating unit 162. The image capturing unit 110 takes a face image of a user, and outputs the captured face image (hereinafter, referred to as a new face image) to the similarity computing unit 120, the display unit 130, and the new card creating unit 162. The image capturing controlling unit 115 controls an image capturing condition of the image capturing unit 110 for the new face image so that the image capturing condition is substantially same as an image capturing condition for the old face image.

The similarity computing unit 120 computes a degree of similarity between the old face image and the new face image. Here, a degree of similarity is an index indicating how an old face image and a new face image resemble each other, and may be computed by image processing or the like. Then, the similarity computing unit 120 outputs the computed degree of similarity to the display unit 130 and the new card creating unit 162. In addition, the similarity computing unit 120 outputs the old face image, the new face image, and the computed degree of similarity to the difference detecting unit 125. The difference detecting unit 125 detects a point of difference between the old face image and the new face image when the degree of similarity between the old face image and the new face image computed by the similarity computing unit 120 is lower than a predetermined reference value. Then, the difference detecting unit 125 outputs information showing the detected point of difference to the display unit 130.

The display unit 130 displays the old face image, the new face image, and the degree of similarity computed by the similarity computing unit 120 on a display monitor and so on. For example, the display unit 130 may display the old face image, the new face image, and the degree of similarity side-by-side. In this way, an operator of the card issuing system 10 can easily refer to the old face image, the new face image, and the degree of similarity. In addition, the display unit 130 may display at least one of the old face image and the new face image and the degree of similarity by overlapping each other. In addition, the display unit 130 may display the point of difference between the old face image and the new face image that is computed by the difference detecting unit 125 when the degree of similarity computed by the similarity computing unit 120 is lower than the predetermined reference value.

When it is judged that the old face image and the new face image are images of the same person, the new card creation approving unit 140 approves the creation of a new card. For example, an operator of the card issuing system 10 judges whether the old face image and the new face image are images of the same person based on the old face image, the new face image, and the degree of similarity displayed on the display unit 130, and inputs the result to the card issuing system 10 using an input means not shown. Then, the new card creation approving unit 140 approves the creation of a new card based on the input decision result. Alternatively, for example, when the degree of similarity is more than the predetermined reference value, the new card creation approving unit 140 may judge that the old face image and the new face image are images of the same person and approve the creation of a new card. Then, the new card creation approving unit 140 informs the new card creating unit 162 of whether the creation of a new card is approved. The personal information inputting unit 150 inputs the updated personal information, and outputs the input personal information to the new card creating unit 162.

The new card creating unit 162 includes a new card printing unit 164 and a-new card storing unit 166. The new card printing unit 164 prints the personal information read by the personal card reading unit 102 and the new face image on the surface of a new card in order to create the new card when the creation of the new card is approved by the new card creation approving unit 140. In addition, when updated personal information is input by the personal information inputting unit 150, the new card printing unit 164 prints the updated personal information and the new face image on the surface of the new card in order to create the new card.

The new card storing unit 166 stores personal information read by the personal card reading unit 102 and the new face image on a storage area provided in the new card. Particularly, the new card storing unit 166 stores the personal information and the new face image on a memory provided in the new card when the new card is an IC card. In addition, the new card storing unit 166 records the personal information and the new face image in a magnetic stripe provided in the new card when the new card is a magnetic stripe card. Further, the new card storing unit 166 may encode the personal information and the new face image with bar codes or two-dimensional codes in order to cause the new card printing unit 164 to print the bar codes or two-dimensional codes when the new card is a card that has information with bar codes or two-dimensional codes. Moreover, the new card storing unit 166 may further store at least one of the degree of similarity between the old face image and the new face image computed by the similarity computing unit 120 and the updated personal information input by the personal information inputting unit 150 on the new card.

Next, the new card creating unit 162 informs the personal card discarding unit 104 of completion of the creation of the new card when printing the personal information and the new face image on the surface of the new card using the new card printing unit 164 and storing the various information on the new card using the new card storing unit 166 have been performed. The personal card discarding unit 104 discards the personal card so as not to be able to use it after the new card has been created by the new card creating unit 162. Here, when the issuance of the new card is not the issuance by the renewal of the personal card, the personal card discarding unit 104 may not discard the personal card. Then, the personal card discarding unit 104 informs the new card issuing unit 168 of the discard of the personal card. The new card issuing unit 168 issues the new card created by the new card creating unit 162 to the user after the personal card has been discarded by the personal card discarding unit 104.

According to the card issuing system 10 of an embodiment of the present invention, since personal information of the new card is created based on the personal information read from the personal card, procedure such as writing personal information on an application paper for the issuance of the new card can be removed, thereby improving availableness of a user.

According to the card issuing system 10 of an embodiment of the present invention, when an operator performs personal authentication, particularly comparing the old face image and the new face image by visual check to judge whether both images are images of the same person is performed only when the displayed degree of similarity is lower than the reference value. Therefore, it is possible to efficiently perform personal authentication compared with judging similarity by visual check in all cases.

When judging whether a subject of each face image belongs to the same person by comparing two face images, it can be judged that each subject does not belong to the same person even in case of the same person in some cases, when image capturing conditions such as an image capturing direction and a lighting direction are different from each other in each face image. However, according to the card issuing system 10 of an embodiment of the present invention, since an image capturing condition of the new face image can substantially be matched to an image capturing condition of the old face image, it is possible to judge whether the subject of each face image belongs to the same person with high precision and compute the degree of similarity of each face image with high precision.

In addition, according to the card issuing system 10, when the old face image and the new face image do not resemble each other in a sufficiently high degree of similarity, a point of difference between face images is displayed. Therefore, it is possible to perform the decision efficiently and with high precision when judging whether the subjects of the old face image and the new face image belong to the same person by visual check.

FIG. 2 is a diagram exemplary showing a process realized by the similarity computing unit 120 according to the present embodiment. The similarity computing unit 120 acquires a face image 250 by performing an edge extraction process using the known method to the old face image read by the personal card reading unit 102. In addition, the similarity computing unit 120 acquires a face image 252 by performing an edge extraction process to the new face image taken by the image capturing unit 110. Next, the similarity computing unit 120 detects a face line 254 from the face image 250. Then, the similarity computing unit 120 detects central axes 256 and 258 from the detected face line 254. In addition, the similarity computing unit 120 detects a face line 260 from the face image 252. Then, the similarity computing unit 120 detects central axes 262 and 264 from the detected face line 260.

Next, the similarity computing unit 120 respectively matches the central axes 256 and 258 with the central axes 262 and 264 and also performs parallel displacement and magnification or reduction to at least one face image so that the sizes of areas respectively surrounded by the face lines 254 and 260 are generally same. In this way, the similarity computing unit 120 acquires the old face image 266 and the new face image 268 having the substantially identical position and size in a face portion.

Then, the similarity computing unit 120 compares the areas surrounded by the face lines in the acquired old face image 266 and new face image 268 on a pixel to pixel basis, and computes the rate of coincidence of pixels between both images as a degree of similarity. Alternatively, the similarity computing unit 120 may compare the images to characteristic portions such as an eye or a mouth to compute a degree of similarity. In addition, the similarity computing unit 120 may compute a degree of coincidence of a characteristic amount such as a contour shape extracted for each portion of the face as a degree of similarity, rather than comparing every pixel.

Figure 3:
FIG. 3 is a diagram exemplary showing information stored on a storage area provided in a new card according to the present embodiment.
Figure 3:

FIG. 3 is a diagram exemplary showing information stored on a storage area provided in a new card 200 according to the present embodiment. The card issuing system 10 stores the old face image, the new face image, the degree of similarity, and the personal information on the storage area provided in the new card 200. Here, the personal information is, e.g., an address, a full name, the date of birth, and so on, and may further include an expiry date and a date of delivery of the new card 200. The card issuing system 10 stores the old face image as well as the new face image on the new card 200. Therefore, when another new card is created using the new card 200 as a personal card, it is possible to compare a face image taken by the image capturing unit 110 with each of the old face image and the new face image stored on the new card 200 to judge whether a user is an owner of the new card 200 with high precision.

In addition, when renewing an expiry-date card such as a driver's license repeatedly, the card issuing system 10 may store a face image taken by the image capturing unit 110 when issuing a card primarily, a plurality of face images taken by the image capturing unit 110 whenever renewing the card, and a plurality of degrees of similarity computed by the similarity computing unit 120 whenever renewing the card on the new card 200. In this way, the card issuing system 10 can estimate a current face image based on secular variation of the face image and the degree of similarity to compute the degree of similarity adding the secular variation. Therefore, it is possible to perform personal authentication with high precision.

Figure 4:
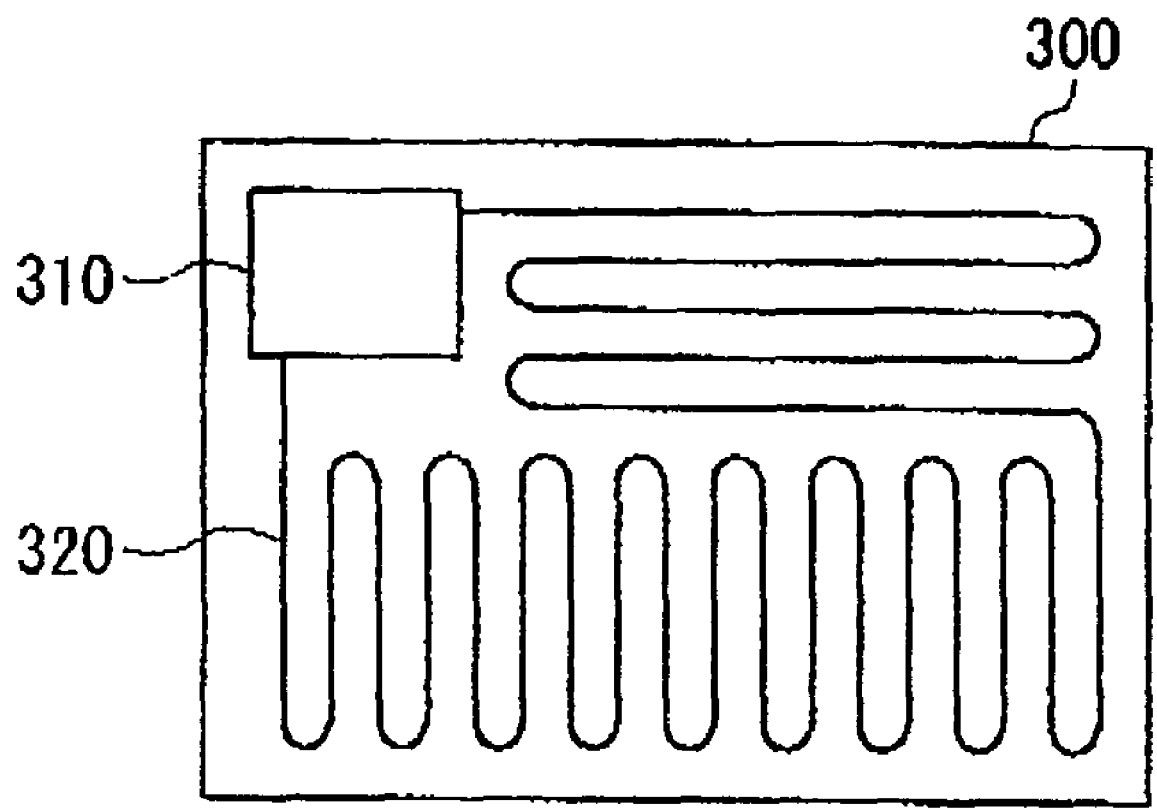
FIG. 4 is a diagram exemplary showing an electric circuit; in a personal card according to the present embodiment.

FIG. 4 is a diagram exemplary showing an electric circuit in a personal card 300 according to the present embodiment. The personal card 300 includes an IC chip 310 including a memory, which performs a process and storage of face images and personal information, and circuit wires 320 connected to the IC chip 310. The personal card discarding unit 104 discards the personal card 300 so that it cannot be used after the new card has been created by the new card creating unit 162, For example, the personal card discarding unit 104 discards the personal card 300 by punching a hole in a position where at least a part of an electric circuit having information of the personal card 300 is provided within the personal card. Here, it is desirable that the electric circuit is provided in an area predetermined as the punched position during discarding the personal card 300 with higher density than that of other areas. In this way, when the personal card discarding unit 104 punches a hole in the personal card 300, it is possible to discard the personal card 300 surely so that it cannot be used. In addition, an electric circuit may include an IC chip such as a memory connected to circuit wires as well as the circuit wires.

In case of the personal card 300 shown in the present drawing, since the area where an electric circuit is provided with high density is wider than the other areas, the punched position during discarding the card is selected from large range, and thus the personal card 300 can be discarded easily. In addition, when the personal card 300 is a magnetic stripe card or a card in which bar codes or two-dimensional codes are written, the personal card discarding unit 104 may discard the personal card 300 by punching a hole or making a scratch in a portion where a magnetic stripe and bar codes or two-dimensional codes are described.

According to the card issuing system 10 of the present embodiment, when renewing a personal card to issue a new card, the personal card is discarded so that it cannot be reused after the new card has been created. Thus, it is possible to prevent the personal card from being used illegally after issuing the new card. In addition, when discarding the personal card, the card issuing system 10 discards the card so that it cannot physically been used. Therefore, it is possible to closely prevent the personal card from being used illegally.

Figure 5:
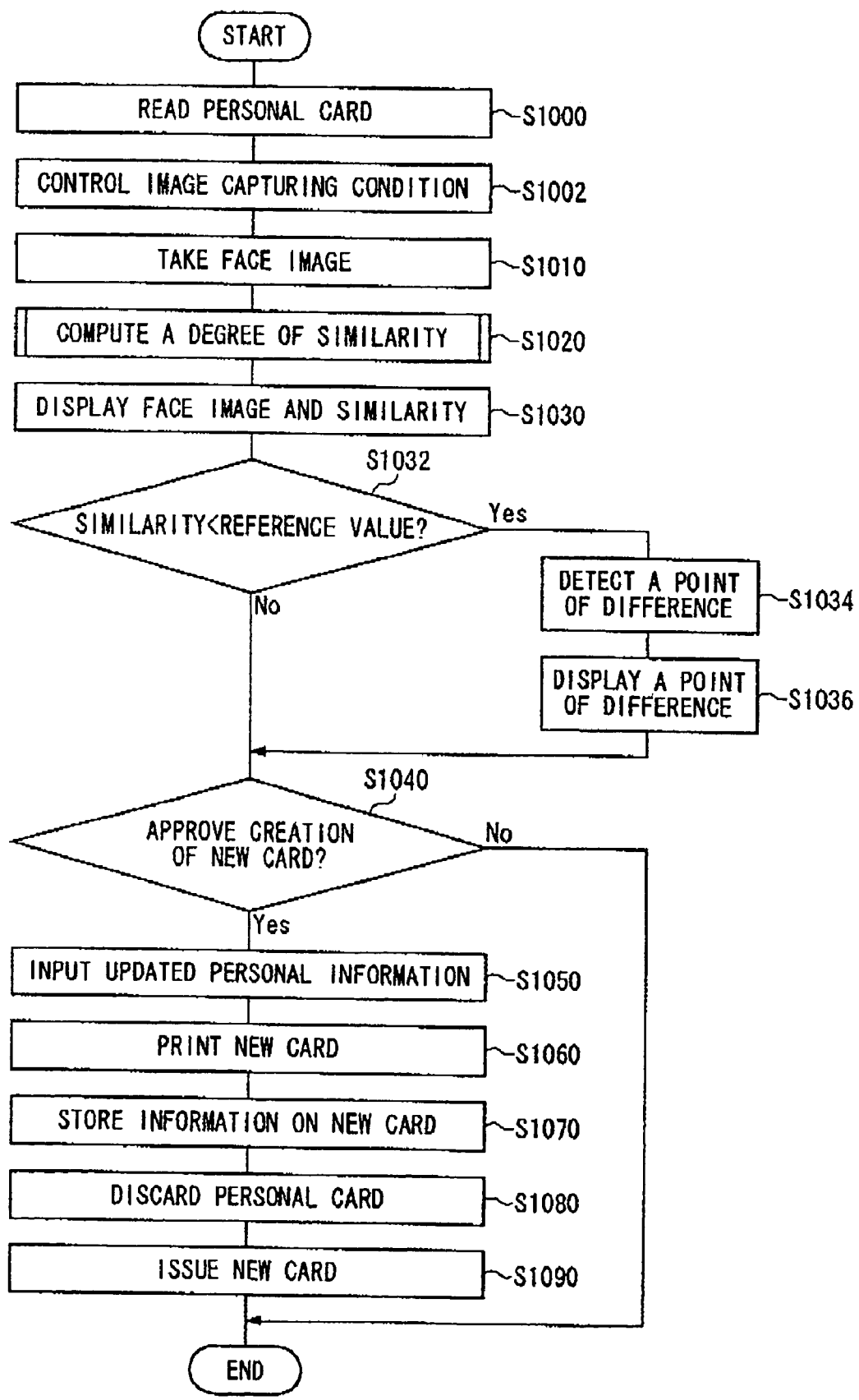
FIG. 5 is a flowchart exemplary showing a process realized by the card issuing system according to the present embodiment.

FIG. 5 is a flowchart exemplary showing a process realized by the card issuing system 10 according to the present embodiment. In this example, the card issuing system 10 issues a new card that is made by renewing a personal card owned by a user. First, the personal card reading unit 102 detects that a personal card is inserted into a slot provided in the card issuing system 10, e.g., by a user in order to read an old face image and personal information from the personal card (S1000). Here, the personal card reading unit 102 may read the old face image and personal information stored on an IC chip of the personal card, or may read a face photograph and personal information printed on the surface of the personal card using scanners. Additionally, in the card issuing system 10 according to this example, it is desirable that the inserted card is locked during using the card issuing system 10 so that the card is not drawn by the user, or the issuance process of the new card is stopped at the point of drawing the card, in the view of the prevention of illegal use of the personal card after issuing the new card. In addition, the personal card reading unit 102 may further read image capturing condition information to show an image capturing condition of the old face image from the personal card. Here, the image capturing condition information may include various types of information such as exposure, white balance, image capturingdirection, intensityoflighting, directionoflighting, and a countenance of photographic subject.

Next, the image capturing controlling unit 115 controls an image capturing condition of the image capturing unit 110 for the new face image so that the condition is substantially same as an image capturing condition of the old face image (S1002). Here, the image capturing controlling unit 115 may control an image capturing condition of the image capturing unit 110 for the new face image based on the old face image read by the personal card reading unit 102 from the personal card. Particularly, the image capturing controlling unit 115 may control an image capturing condition of the new face image based on an image capturing condition of the old face image when the known image processing is performed to the old face image.

For example, the image capturing controlling unit 115 may control exposure in the image capturing unit 110, so that mean value of brightness in the whole old face image and mean value of brightness in the new face image are substantially same. In addition, the image capturing controlling unit 115 may control white balance in the image capturing unit 110, so that, for example, color distribution in the old face image and color distribution in the new face image are substantially same. Further, the image capturing controlling unit 115 may control the position of the image capturing unit 110 and image capturing direction, so that the face of user is taken in the substantially same direction as, e.g., the direction of face in the old face image computed by the known image processing technique. Moreover, the image capturing controlling unit 115 may compute the intensity of lighting when the old face image has been taken based on the mean value of brightness in the whole old face image and the distribution of brightness in pixels included in the old face image (such as brightness difference between the brightest pixel and the darkest pixel) and may control the intensity of the lighting provided in the card issuing system 10 so that this intensity is substantially same as the computed intensity. Additionally, the image capturing controlling unit 115 may detect which direction the face of photographic subject is shined by the lighting from when the old face image has been taken based on the difference between mean values of brightness on right and left or upper and lower portions of the face that the photographic subject in the old face image, and also may control the position and direction of the lighting so that the lighting provided in the card issuing system 10 illuminates the user's face from the detected direction. Furthermore, the image capturing controlling unit 115 extracts a special feature showing the position and shape of each portion in the face image such as eyebrows, eyes, a nose, and a mouth of photographic subject in the old face image. The image capturing controlling unit 115 detects a countenance of photographic subject in the old face image using a countenance database that stores a countenance of photographic subject such as a smiling face, an angry face, and a weeping face and a special feature showing the position and shape of each portion of the face such as eyebrows, eyes, a nose, and a mouth in association with each other, and a special feature extracted from the old face image. The image capturing controlling unit 115 may make sounds "Please smile" through a speaker before the image capturing unit 110 takes the face image of user in order to take a new face image having the same countenance as that of photographic subject in the old face image. In this way, since the image capturing condition of the image capturing unit 110 can be controlled based on information acquired from the face image so that the image capturing conditions of the old and new face images are substantially same, it is possible to judge whether the photographic subject of each face image belongs to the same person with high precision or to compute a degree of similarity of each face image with high precision.

In addition, when the personal card reading unit 102 reads image capturing condition information of the old face image from the personal card, the image capturing controlling unit 115 may control an image capturing condition of the image capturing unit 110 for the new face image so that this condition is substantially same as an image capturing condition shown by the image capturing condition information read from the personal card. For example, the image capturing controlling unit 115 may control exposure of the image capturing unit 110, white balance, image capturing direction against the photographic subject, intensity of lighting, direction of lighting, and so on based on the image capturing condition information of the old face image. In addition, for example, the image capturing controlling unit 115 may perform so that the new face image is taken with the same countenance as that of the photographic subject in the old face image. Since the image capturing condition of the image capturing unit 110 can be controlled based on an image capturing condition showing the image capturing condition information when taking the old face image, which is stored on the personal card, so that the image capturing conditions of the old and new face images are substantially same, it is possible to judge whether the photographic subject of each face image belongs to the same person with high precision or to compute a degree of similarity of each face image with high precision.

Further, in this example, the image capturing controlling unit 115 controls the image capturing condition of the image capturing unit 110 so that the image capturing condition of the new face image is substantially same as that of the old face image. Alternatively, the image capturing controlling unit 115 may perform image processing such as color correction process to the new face image previously taken by the image capturing unit 110 so that the image capturing condition of the new face image is substantially same as that of the old face image in appearance.

Next, the image capturing unit 110 takes a new face image that is a face image of the user who has applied for the issuance of a new card (S1010). Then, the similarity computing unit 120 computes a degree of similarity between the old face image and the new face image (S1020). Then, the display unit 130 displays the old face image, the new face image, and its degree of similarity (S1030). Here, the display unit 130 may display the degree of similarity with a percentage such as 80% or a level such as A/B/C.

Next, the card issuing system 10 judges whether the degree of similarity computed by the similarity computing unit 120 is lower than a predetermined reference value (S1032). Here, the predetermined reference value may be a maximum value of the degree of similarity when, for example, the operator compares the old face image and the new face image by visual check and judges whether the photographic subject of each face image belongs to the same person, or may previously be determined by a manager or an operator of the card issuing system 10 as, e.g., 75%.

Then, when it is judged that the degree of similarity is lower than the reference value (S1032: Yes), the difference detecting unit 125 detects a point of difference between the old face image and the new face image (S1034). Here, the point of difference may be, e.g., an area in the face image and a portion of the face. For example, when the similarity computing unit 120 compares the old face image and the new face image, the difference detecting unit 125 may detect an area in which the coincidence of pixel value is low and a portion of the face in which the coincidence of characteristic amount extracted from the face images is low.

Next, the display unit 130 displays the point of difference of the old face image and the new face image detected by the difference detecting unit 125 (S1036). For example, the display unit 130 may display the areas showing the detected point of difference by surrounding these areas with a frame in each of the old face image and the new face image. In this way, for example, when comparing the old face image and the new face image by visual check, since the operator can easily understand which portion is different from each other in each face image, it is possible to perform personal authentication efficiently and with high precision. In addition, the display unit 130 may display only portions showing the point of difference, or may display the names of portions of the face showing the point of difference, in place of surrounding the portions showing the point of difference with a frame.

Next, the new card creation approving unit 140 judges whether or not approving the creation of the new card based on whether it is judged that the old face image and the new face image belong to the same person (S1040). Here, when the operator recognizes that the degree of similarity displayed on the display unit 130 is less than the predetermined reference value, e.g., 75% or the predetermined level, e.g., A, the operator compares the old image and the new image displayed on the display unit 130 side-by-side in relation to the degree of similarity to judge whether each face image belongs to the same person, inputs the result using, e.g., a button provided in an input terminal to inform the card issuing system 10 of it, and causes the card issuing system 10 to perform approval or disapproval of creation of the new card. In this way, since the comparison of the old face image and the new face image is finally performed by visual check of the operator, personal authentication can be performed with high precision.

Alternatively, when the degree of similarity is less than the predetermined reference value, e.g., 75%, the card issuing system 10 may automatically refuse the creation of new card. In this way, since personal authentication can be automated when the card issuing system 10 can judge whether the old face image and the new face image are the same person with high precision, the creation time of new card can be shortened, and thus the availableness of the user is improved.

When the creation of new card is refused (S1040: No), the card issuing system 10 cancels the issuance of new card and discharges the inserted personal card to return it to the user. When the creation of new card is approved (S1040: Yes), the personal information inputting unit 150 inputs the updated personal information if needed (S1050). For example, when the user wants to issue a new card in which personal information different from the personal information recorded in the personal card is recorded, the personal information inputting unit 150 receives personal information input by an input terminal or the like to input the updated personal information. In addition, for example, the personal information inputting unit 150 may read personal information from another card owned by the user to input the updated personal information. Therefore, since personal information read from another card is used as personal information printed and recorded on/in the new card, procedure such as writing personal information on an application paper can be removed, thereby improving availableness of a user.

Next, the new card printing unit 164 prints personal information read by the personal card reading unit 102 or personal information input by the personal information inputting unit 150 and the new face image taken by the image capturing unit 110 on, e.g., the surface of the blank card that is stocked in the card issuing system 10 in order to create the new card (S1060). Then, the new card storing unit 166 stores personal information read by the personal card reading unit 102 or personal information input by the personal information inputting unit 150, the old face image, the new face image, and the degree of similarity on, e.g., a memory that is provided in the new card (S1070). Here, the new card storing unit 166 may store image capturing condition information showing an image capturing condition of the image capturing unit 110 for the new face image on the memory that is provided in the new card. In this way, when secondly issuing another new card using that new card, the process to control the image capturing condition of the image capturing unit 110 can be realized with high precision so that the image capturing condition of the old face image and the image capturing condition of the new face image are substantially same.

Next, the personal card discarding unit 104 discards the personal card so that the personal card can not be used after the new card has been created (S1080). Then, the new card issuing unit 168 discharges and issues the created new card after the personal card has been discarded by the personal card discarding unit 104 (S1090). For example, when the system does not allow the user to draw the personal card inserted into a slot during using the card issuing system 10, since the card issuing system 10 issues the new card after confirming the discard of the personal card, the user can own only one of the personal card and the new card. In this way, the illegal use of personal card can be prevented after issuing the new card.

Further, in this example, when creating the new card, it has been described that the new card creating unit 162 uses the new face image taken by the image capturing unit 110 as both the face image printed on the surface of the new card and the face image stored on the memory provided in the new card. Alternatively, the new card creating unit 162 may print the old face image on the surface of the new card and also store the new face image taken by the image capturing unit 110 on the memory provided in the new card in order to create the new card. In this way, for example, when the user prefers using the old face image, it is possible continue to use the old face image as the face image to be printed on the new card even after renewing the card. On the other hand, since the new face image taken by the image capturing unit 110 is used as the face image stored on the memory within the new card, a newer face image can be used in individual authentication when renewing the card secondly. Therefore, it is possible to perform individual authentication during renewing the card with high precision.

Figure 6:
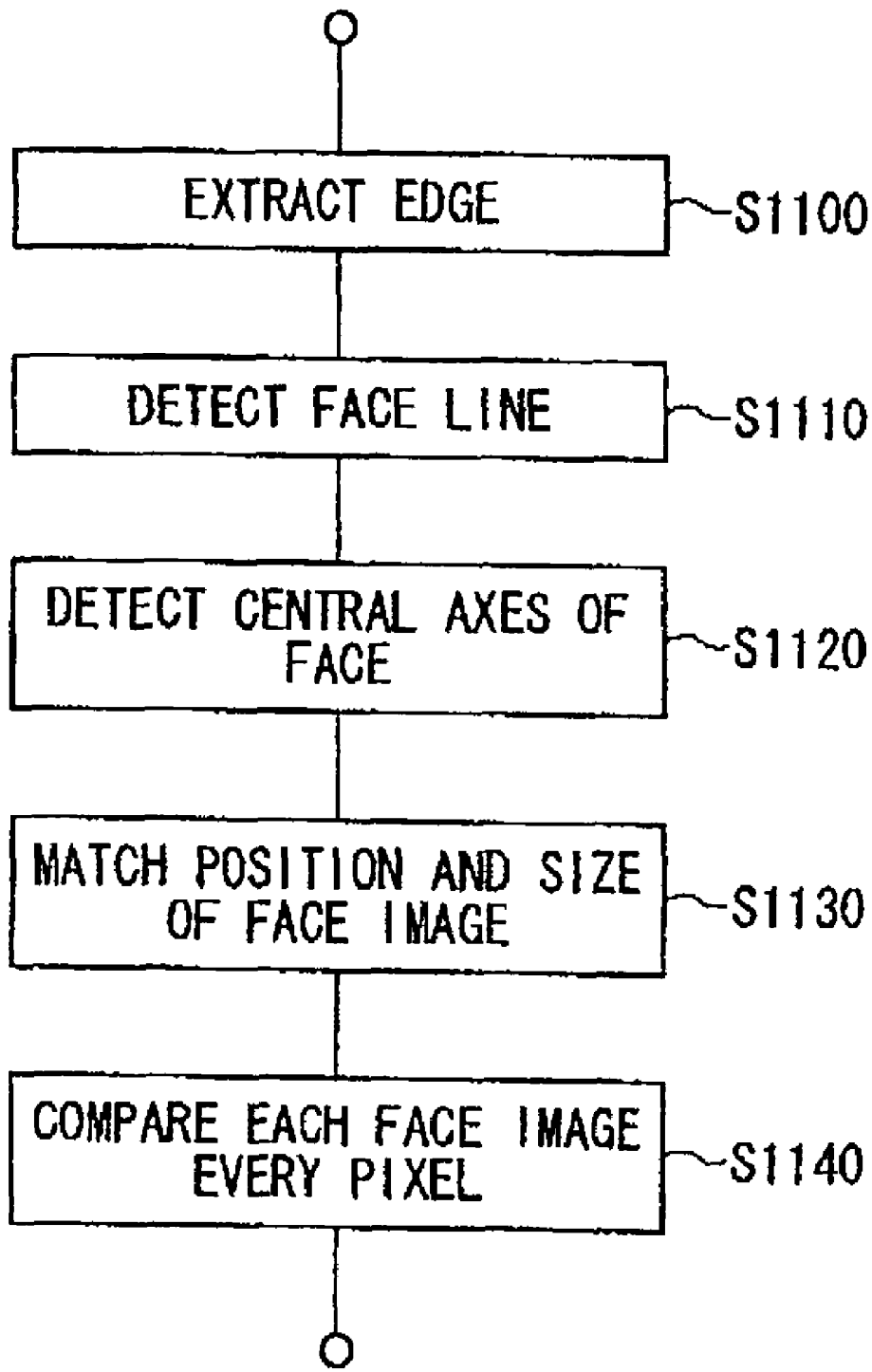
FIG. 6 is a flowchart exemplary showing details of S1020.

FIG. 6 is a flowchart exemplary showing the details of S1020. First, the similarity computing unit 120 acquires face images that are formed by extracting edge portions of the old face image and the new face image respectively (S1100). Then, the similarity computing unit 120 detects a face line in each face image (S1110). Then, the similarity computing unit 120 seeks central axes in the face lines of the detected faces (S1120). Then, the similarity computing unit 120 matches the central axes, and also performs parallel displacement and magnification or reduction to the face image so that the sizes of areas surrounded by the face lines of the face images are matched (S1130). Then, the similarity computing unit 120 compares the areas surrounded by the face lines in each face image on a pixel to pixel basis, and computes the rate of coincidence of pixels between both images as a degree of similarity (S1140).

Figure 7:
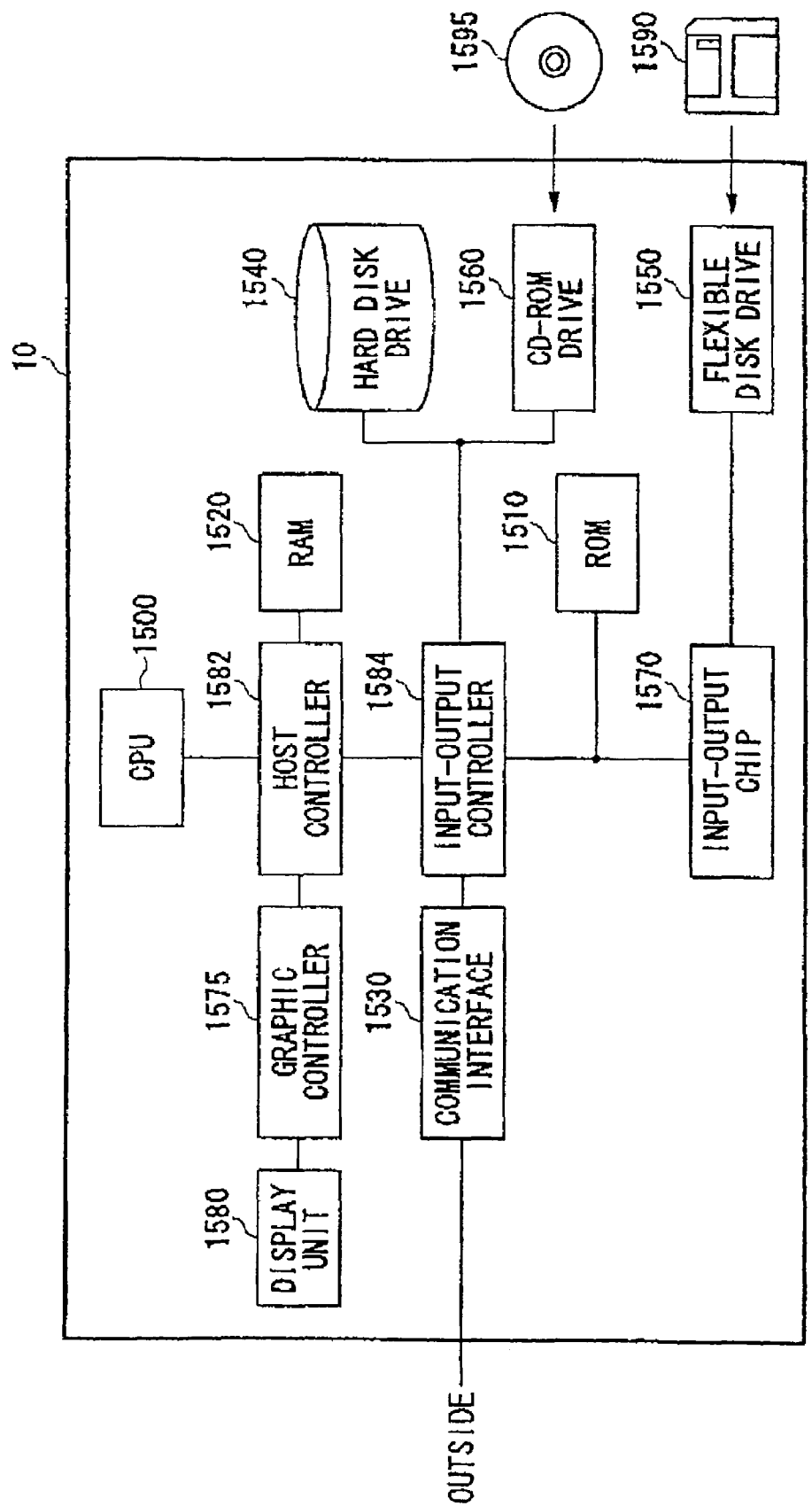
FIG. 7 is a block diagram exemplary showing a configuration of a computer system functioning as the card issuing system according to the present embodiment.

FIG. 7 is a block diagram exemplary showing a configuration of a computer system functioning as the card issuing system 10 according to the present embodiment. The card issuing system 10 includes a CPU peripheral unit having a CPU 1500, a RAM 1520, and a graphic controller 1575 connected to each other by a host controller 1582, and a display unit 1580, an input-output unit having a communication interface 1530 connected to the host controller 1582 by an input-output controller 1584, a hard disk drive 1540, and a CD-ROM drive 1560, and a legacy input-output unit having a ROM 1510 connected to the input-output controller 1584, a flexible disk drive 1550, and an input-output chip 1570.

The host controller 1582 is connected to the RAM 1520, the CPU 1500 that accesses the RAM 1520 at high transfer rate, and the graphic controller 1575. The CPU 1500 operates based on a program stored on the ROM 1510 and the RAM 1520 to control each unit. The graphic controller 1575 acquires image data that the CPU 1500 or the like generates on a frame buffer provided in the RAM 1520, and displays it on the display unit 1580. Alternatively, the graphic controller 1575 may internally include a frame buffer storing image data generated by the CPU 1500 or the like.

The input-output controller 1584 is connected to the host controller 1582, the communication interface 1530 that is an input-output device that relatively operates at high speed, the hard disk drive 1540, and the CD-ROM drive 1560. The communication interface 1530 is connected to outside devices, a personal card, a new card, and so on. The hard disk drive 1540 stores a program and data used by the card issuing system 10. The CD-ROM drive 1560 reads the program or data from a CD-ROM 1595, and provides it to the input-output chip 1570 via the-RAM 1520.

Furthermore, the input-output controller 1584 is connected to the ROM 1510 and an input-output device that relatively operates at low speed such as the flexible disk drive 1550 and the input-output chip 1570. The ROM 1510 stores a boot program realized by the CPU 1500 during starting the card issuing system 10, a program depending on a hardware of the card issuing system 10, and so on. The flexible disk drive 1550 reads a program or data from a flexible disk 1590, and provides it to the input-output chip 1570 via the RAM 1520. The input-output chip 1570 is connected to various types of input-output device via the flexible disk 1590 or, e.g., a parallel port, a serial port, a keyboard port, a mouse port, and so on.

A program to be used in the card issuing system 10 is stored on a recording medium such as the flexible disk 1590, the CD-ROM 1595 or an IC card in order to be provided by the user. The program is read from the recording medium and is installed in the card issuing system 10 to be carried out via at least one of the input-output chip 1570 and the input-output controller 1584. The card issuing program that is installed and realized in the card issuing system 10 causes the card issuing system 10 to operate in order to realize the functions of the card issuing system 10 described in FIGS. 1 to 6.

The program described above may be stored on outside storage media. The storage media can include an optical recording medium such as DVD and PD, a magneto-optical recording medium such as MD, a tape medium, a semiconductor memory such as an IC card, and so on, in addition to the flexible disk 1590 and the CD-ROM 1595. In addition, the program may be provided to the card issuing system 10 via a network by using a storage device such as a hard disk or an RAM provided in a server system that is connected to a private telecommunication network and Internet as a recording medium.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A card issuing system, comprising:
a personal card reading unit operable to read a face image and personal information from a personal card;
an image capturing unit operable to take a face image of a user;
a similarity computing unit operable to compute a degree of similarity between the face image read by said personal card reading unit and the face image taken by said image capturing unit;
a display unit operable to display the face image read by said personal card reading unit, the face image taken by said image capturing unit, and the degree of similarity computed by said similarity computing unit side-by-side;
a new card creation approving unit operable to approve a creation of a new card when it is judged that the face image read by said personal card reading unit and the face image taken by said image capturing unit are images of the same person; and
a new card creating unit operable to print the personal information read by said personal card reading unit and the face image taken by said image capturing unit on the surface of the new card and also store the information and the image on a memory provided in the new card in order to create the new card when being approved by said new card creation approving unit,
wherein said new card creating unit further stores the face image read by said personal card reading unit and the degree of similarity computed by said similarity computing unit on the memory provided in the new card.

2. A card issuing system, comprising:
a personal card reading unit operable to read a face image and personal information from a personal card;
an image capturing unit operable to take a face image of a user;
a similarity computing unit operable to compute a degree of similarity between the face image read by said personal card reading unit and the face image taken by said image capturing unit;
a display unit operable to display the face image read by said personal card reading unit, the face image taken by said image capturing unit, and the degree of similarity computed by said similarity computing unit side-by-side;
a new card creation approving unit operable to approve a creation of a new card when it is judged that the face image read by said personal card reading unit and the face image taken by said image capturing unit are images of the same person;
a new card creating unit operable to print the personal information read by said personal card reading unit and the face image taken by said image capturing unit on the surface of the new card and also store the information and the image on a memory provided in the new card in order to create the new card when being approved by said new card creation approving unit; and
an image capturing controlling unit operable to control an image capturing condition of said image capturing unit for the face image of the user so that the image capturing condition is substantially same as an image capturing condition for the face image stored on the personal card,
wherein said image capturing controlling unit controls the image capturing condition of the face image of the user in said image capturing unit based on the face image read by said personal card reading unit from the personal card.

3. A card issuing system, comprising:
a personal card reading unit operable to read a face image and personal information from a personal card;
an image capturing unit operable to take a face image of a user;
a similarity computing unit operable to compute a degree of similarity between the face image read by said personal card reading unit and the face image taken by said image capturing unit;
a display unit operable to display the face image read by said personal card reading unit, the face image taken by said image capturing unit, and the degree of similarity computed by said similarity computing unit side-by-side;

a new card creation approving unit operable to approve a creation of a new card when it is judged that the face image read by said personal card reading unit and the face image taken by said image capturing unit are images of the same person;

a new card creating unit operable to print the personal information read by said personal card reading unit and the face image taken by said image capturing unit on the surface of the new card and also store the information and the image on a memory provided in the new card in order to create the new card when being approved by said new card creation approving unit; and an image capturing controlling unit operable to control an image capturing condition of said image capturing unit for the face image of the user so that the image capturing condition is substantially same as an image capturing condition for the face image stored on the personal card, wherein said personal card reading unit further reads image capturing condition information showing an image capturing condition stored on the personal card from the personal card, and said image capturing controlling unit controls an image capturing condition of said image capturing unit for the face image of the user so that the image capturing condition is substantially same as the image capturing condition shown by the image capturing condition information.

4. The card issuing system as claimed in claim 3, wherein said new card creating unit further stores the image capturing condition information showing an image capturing condition of said image capturing unit for the face image of the user on the memory provided in the new card in order to create the new card.

* * * * *